No. 859,084. PATENTED JULY 2, 1907.
C. J. KOENIG.
GLASS FURNACE.
APPLICATION FILED JUNE 20, 1906.
2 SHEETS—SHEET 1.
Fig. I.
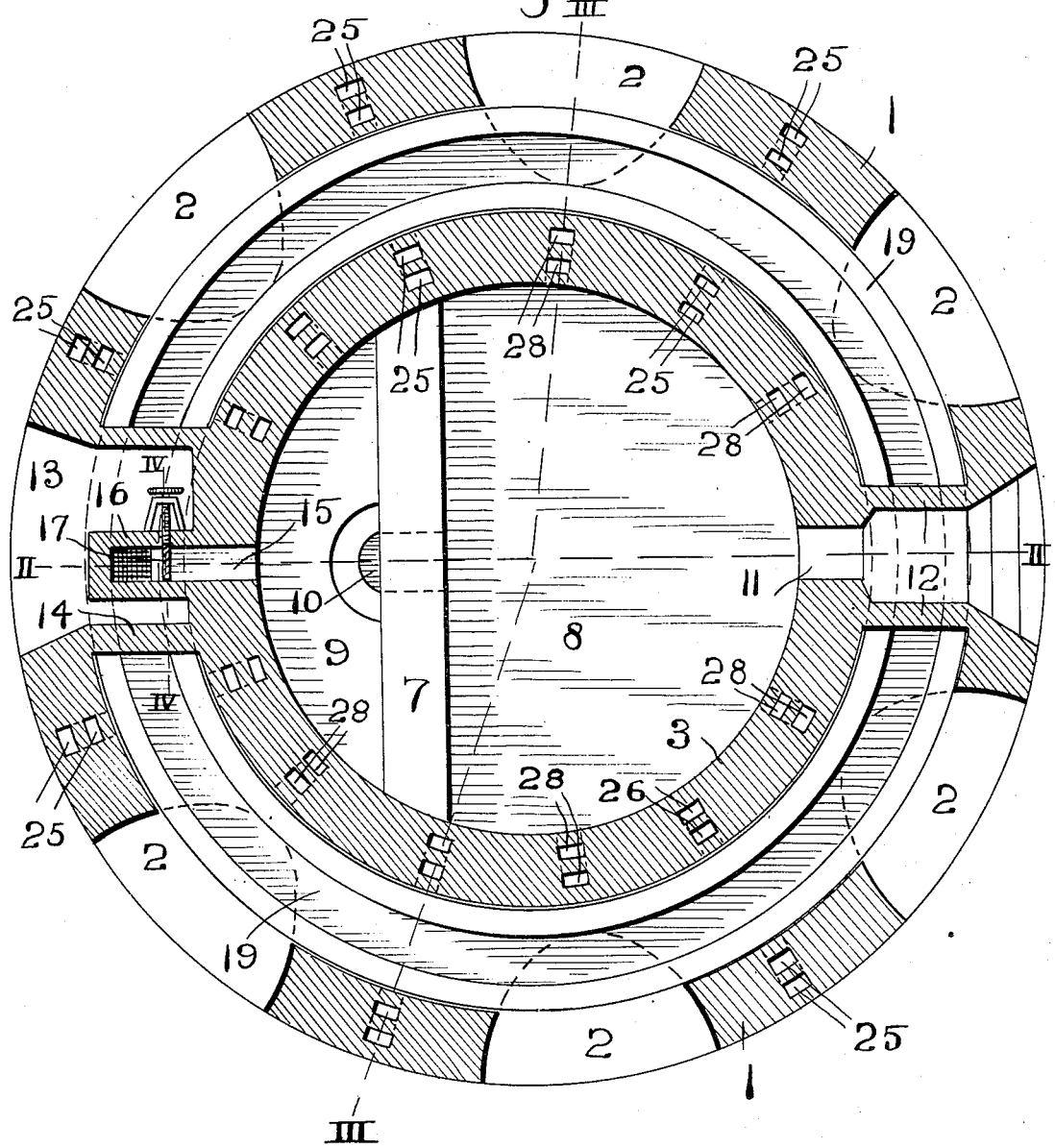
Attest.
Inventor.
Christian J. Koenig No. 859,084. PATENTED JULY 2, 1907.
C. J. KOENIG.
GLASS FURNACE.
APPLICATION FILED JUNE 20, 1906.
2 SHEETS—SHEET 2.
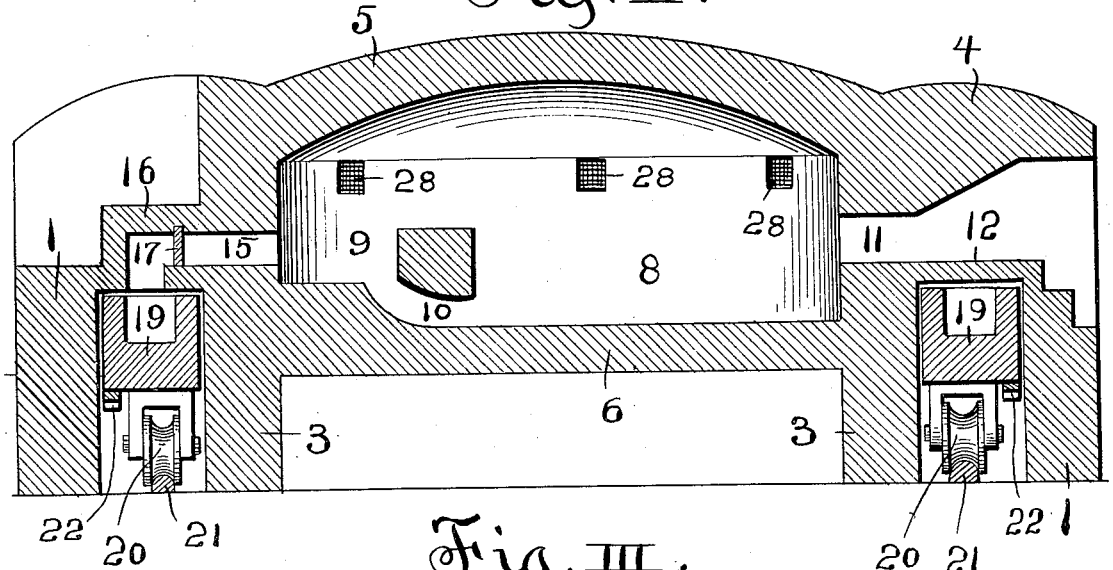
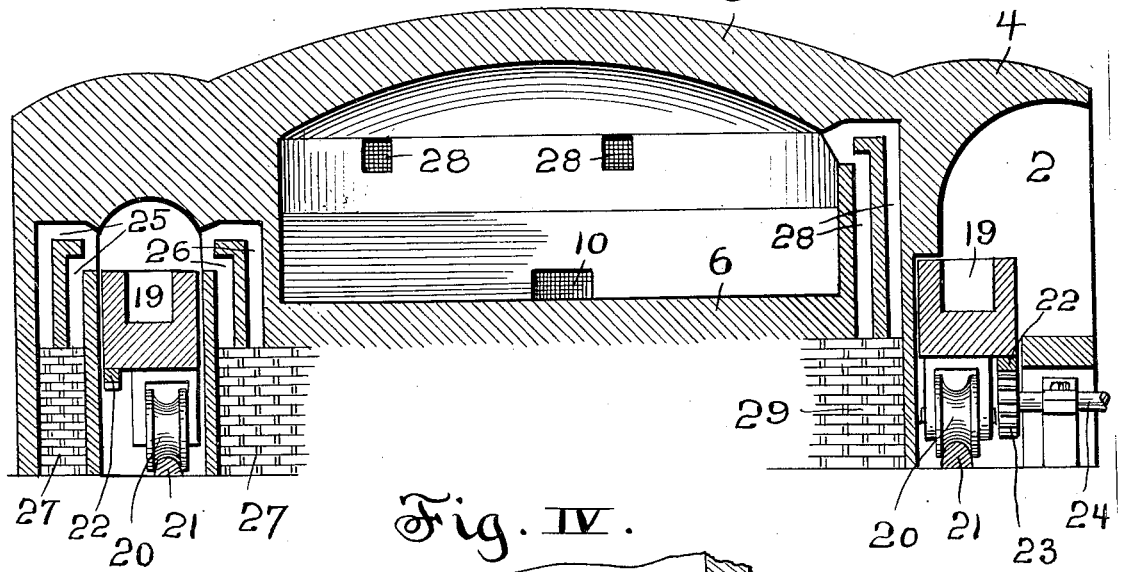
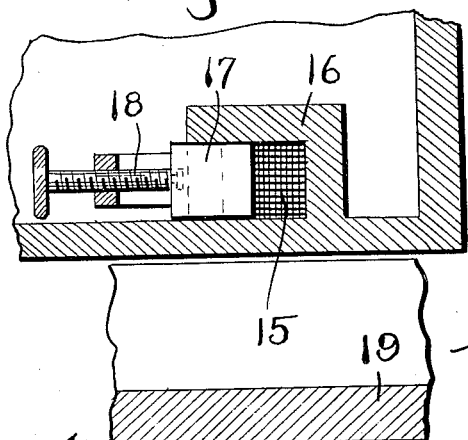
Attest.
Ibruggenburg
Walter F. Cobick.
Inventor.
Christian J Koenig

UNITED STATES PATENT OFFICE.

CHRISTIAN J. KOENIG, OF ALTON, ILLINOIS.

GLASS-FURNACE.

No. 859,084.        Specification of Letters Patent.        Patented July 2, 1907.

Application filed June 20, 1906. Serial No. 322,495.

*To all whom it may concern:*

Be it known that I, CHRISTIAN J. KOENIG, a citizen of the United States, residing at Alton, county of Madison, State of Illinois, have invented certain new and useful Improvements in Glass-Furnaces, of which the following is a full, clear, and exact description, reference being had to the accompanying drawings.

My invention relates to a glass furnace which is particularly adapted for feeding or delivering molten glass to a number of automatic glass blowing machines, and the principal object of my invention is to construct a glass furnace having a movable trough which receives the molten glass from the melting chamber on the interior of the furnace and delivers said glass to the automatic blowing machines which are conveniently located adjacent the outer wall of the furnace.

A further object of my invention is to arrange air and gas flues in the furnace walls on each side of the movable trough whereby the glass in the trough is constantly maintained in the proper molten condition while being delivered to the blowing machines.

A further object of my invention is to provide means whereby the trough is continuously rotated, and also means whereby the supply of molten glass from the melting chamber to the trough may be conveniently cut off.

My invention consists in certain novel features of construction and arrangement of parts that will be hereinafter more fully described, specified and claimed.

In the drawings: Figure I is a horizontal section taken through the furnace immediately above the movable trough therein. Fig. II is a transverse section taken on a line II—II of Fig. I. Fig. III is a transverse section taken on the line III—III of Fig. I. Fig. IV is an enlarged detail section taken on the line IV—IV of Fig. I.

Referring by numerals to the accompanying drawings, 1 designates the outer wall of the furnace which is constructed of fire brick or similar material, circular in form, and intersected at suitable intervals with inwardly extending pockets or niches 2 which are occupied by the automatic blowing machines. Located on the inside of this outer wall, and concentric therewith, is an inner wall 3 of fire brick or analogous material, and thus a circular space is formed between the two walls, which is occupied by the movable trough. The space between the walls 1 and 3 is covered with brick, or analogous material as indicated by 4, and a similar covering 5 is arranged over the circular chamber formed within the circular wall 3. This circular chamber within the wall 3 is provided with a suitable bottom 6, and extending transversely therein is a partition wall 7 which divides the circular chamber into a melting compartment or chamber 8, and a working-out compartment or chamber 9, there being a duct 10 underneath the partition 7 which leads from the chamber 8 to the chamber 9.

Leading through the walls 1 and 3, into the chamber 8, is a suitable opening 11 which is inclosed by a wall 12 in the space between the walls 1 and 3, through which opening 11 the material to be melted is delivered to the chamber 8.

An opening 13 is formed through the wall 1 directly opposite from the opening 11, which opening 13 is inclosed by a suitable wall 14 arranged in the space between the walls 1 and 3. Leading outwardly from the chamber 9 through the wall 3 into this opening 13, is an outlet duct 15 which is inclosed by a suitable wall 16, which duct discharges through the bottom of the wall 16 into the space between the walls 1 and 3.

Arranged for horizontal movement through one side of the wall 16, is a plate 17 which is operated by means of a screw shaft 18, and which is intended for closing the duct 15 to prevent the passage of molten glass therethrough.

Located in the circular space between the walls 1 and 3 is a circular trough 19 which is provided with an open top and which is constructed of fire clay or analogous material. The outer portion of this trough travels through the inner portions of the pockets or niches 2, so that the automatic machines located in said pockets can readily be fed when the blank molds or glass-gathering mechanism dips into the open top of the trough. Arranged on the underside of this trough, at suitable distances apart, are grooved traction wheels 20 which travel upon a suitable track 21.

Arranged on the underside of the trough, at the outer edge thereof, is a circular rack 22, with which meshes a gear wheel 23, carried by a suitably driven shaft 24, thus providing means for continuously rotating the trough.

Formed in the wall 1, between the pockets or niches therein, are the vertically disposed air and gas inlet ducts 25, the upper ends of which being extended inwardly and each pair of ducts unite and discharge into the space between the walls 1 and 3 immediately above the trough 19.

Arranged in the wall 3, directly opposite each pair of ducts 25, is a similar pair of vertically disposed ducts 26, the upper ends of which unite and discharge into the space between the walls 1 and 3 above the trough 19 and immediately opposite the discharge opening of the opposite pair of ducts 25.

Located immediately below all of the ducts 25 and 26 in the walls 1 and 3, is suitable checker work 27, through which passes the air and gas utilized for heating the glass within the trough 19, which air and gas ignites as it discharges from the upper ends of the ducts 25 and 26.

Formed in the wall 3, between the ducts 26, are the pairs of vertically disposed ducts 28 the upper ends of which unite and discharge into the melting and working-out chambers 8 and 9 immediately below the top 5 of said chambers.

Arranged in the wall 3, at the lower ends of these ducts, is suitable checker work 29, through which passes the air and gas that ignites within the melting and working-out chambers and thus provides means for melting the glass in said chambers.

The operation of my improved furnace is as follows: The material to be melted is fed into the melting chamber 8 through the opening 11 and is melted therein by the heat of the ignited gas and air entering said chamber through the ducts 28. The molten glass passes from the melting chamber 8 to the working-out chamber 9 through the duct 10, and when the plate 17 is withdrawn from the opening 15 said molten glass passes through said opening and discharges into the open top of the trough 19. Rotary motion is imparted to the shaft 24 and as a result the trough 19 is correspondingly rotated owing to the engagement of the gear wheel 23 with the rack 22. The grooved wheels 20 travel upon the track 21 and thus support the trough 19 in proper position. The molten glass, after being delivered into the trough 19, is kept heated to the proper degree so as to be in a working condition by means of the heat generated by the ignited gas and air delivered through the pairs of ducts 25 and 26. As the trough 19 is rotated, the molten glass therein is exposed in passing through the pockets or niches 2, and at these points the glass-gathering mechanisms of the automatic blowing machines dip into the open top of the trough. When desired, the plate 17 can be moved inwardly to close the duct 15, thus cutting off the delivery of molten glass to the trough 19.

It will thus be seen how I have constructed a furnace wherein the glass is primarily melted and then delivered to the rotating trough, and the glass while in the trough being maintained in a proper working condition by the direct application of heat within the chamber occupied by said trough.

A furnace of my improved construction can be readily built so as to accommodate a various number of automatic machines, it only being necessary to increase or decrease the diameter of the furnace and vary the spaces between the niches or pockets in which the automatic machines are located.

I have not shown a stack or outlet for the furnace, but it will be readily understood by persons familiar with furnaces of this description, that the products of combustion in the melting chamber and from the space above the trough 19 pass alternately from one set of gas and air inlet ducts to the opposite pair, and out through the checker work located beneath said ducts.

I claim:

1. The combination with a glass furnace, having pockets formed in its outer wall and having a melting chamber, of a rotating trough within the furnace and surrounding the melting chamber which trough travels through the pockets when rotated, substantially as specified.

2. The combination with a glass furnace having pockets formed in its outer wall and having a melting chamber, of a rotating trough within the furnace and surrounding the melting chamber which trough travels through the pockets when rotated, and means whereby the trough is heated, substantially as specified.

3. The combination with a glass furnace, of a rotating trough which receives molten glass directly from the melting chamber of the furnace, means whereby the glass in the trough is maintained in a molten condition, means whereby the trough is rotated, and there being pockets formed in the outer wall of the furnace through which pockets the trough travels when rotated, substantially as specified.

4. A circular glass furnace provided with double walls and a molten glass receiving trough arranged between the double walls, substantially as specified.

5. A circular glass furnace provided with double walls, a molten glass receiving trough arranged between the double walls, and means whereby said trough is rotated, substantially as specified.

6. A circular glass furnace provided with double walls, a molten glass receiving trough arranged between the double walls, means whereby a proper heat is maintained within the furnace and between the double walls, and means whereby the trough is rotated, substantially as specified.

7. A circular glass furnace provided with double walls, there being pockets formed through the outer wall of said furnace, and a molten glass receiving trough arranged for rotation between the double walls, substantially as specified.

8. A circular glass furnace provided with double walls, a molten glass receiving trough arranged for rotation between the double walls, and means whereby molten glass from the interior of the furnace is discharged into the trough, substantially as specified.

9. A circular glass furnace provided with double walls, a molten glass receiving trough arranged between the double walls, means whereby heat is generated on the interior of the furnace, and means whereby heat is generated between the double walls of the furnace, substantially as specified.

10. A glass furnace having an internal melting chamber combined with a rotatable trough surrounding the melting chamber substantially as shown and described.

11. A glass furnace combining a melting pot or chamber, with a surrounding independent annular trough which receives molten glass from the melting chamber substantially as shown and described.

12. A glass furnace combining a melting pot or chamber with an independent annular trough which receives molten glass from the melting chamber together with means for melting the glass within the melting chamber, and supplemental means for maintaining the glass in the trough in proper working condition substantially as shown and described.

13. In a glass furnace, the combination with an annular rotatable trough, of a melting chamber surrounded by said annular trough, means for leading the glass from the melting chamber into the annular trough, and means for maintaining the glass in the annular trough in proper working condition substantially as shown and described.

14. In a glass furnace, the combination with an annular rotatable trough, of a melting chamber surrounded by said annular trough, means for leading the glass from the melting chamber into the annular trough, means for maintaining the glass in the annular trough in proper working condition, and means for regulating the flow of glass from the melting chamber into the annular trough, substantially as shown and described.

15. In a glass furnace, a stationary melting chamber combined with a surrounding annular rotating trough which receives the molten glass directly from the melting chamber, substantially as shown and described.

16. A circular glass furnace provided with double walls and a concentric stationary melting chamber combined with a molten glass receiving annular trough arranged between the double walls and around the melting chamber, substantially as specified.

17. A circular glass furnace provided with double walls and a concentric stationary melting chamber combined with a molten glass receiving annular trough arranged between the double walls and around the melting chamber, means for heating the melting chamber, and independent means for maintaining the molten glass within the trough at a proper temperature substantially as specified.

18. The combination with a glass furnace, of a trough inclosing said furnace, which trough receives molten glass from the furnace, substantially as shown and described.

19. The combination with a glass furnace, of walls arranged around the furnace to form an annular chamber, and a trough positioned in said chamber, which trough receives molten glass from the furnace.

In testimony whereof, I have signed my name to this specification in the presence of two subscribing witnesses.

CHRISTIAN J. KOENIG.

Witnesses:
C. F. HUEGGENBURG,
WALTER F. COBECK.